(12) United States Patent
Bisdikian et al.

(10) Patent No.: US 8,589,389 B2
(45) Date of Patent: Nov. 19, 2013

(54) CHARACTERIZING AND SELECTING PROVIDERS OF RELEVANT INFORMATION BASED ON QUALITY OF INFORMATION METRICS

(75) Inventors: Chatschik Bisdikian, Chappaqua, NY (US); Georgios Tychogiorgos, Karditsa (GR)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 13/029,156

(22) Filed: Feb. 17, 2011

(65) Prior Publication Data

US 2012/0215893 A1 Aug. 23, 2012

(51) Int. Cl.
*G06F 17/30* (2006.01)

(52) U.S. Cl.
USPC .......................................... 707/728; 707/741

(58) Field of Classification Search
USPC ................. 707/672–677, 781–788, 728–736, 707/748–751
See application file for complete search history.

(56) References Cited

U.S. PATENT DOCUMENTS

| 7,346,597 B2 | 3/2008 | Dumas |
| 7,475,060 B2 | 1/2009 | Toyama et al. |
| 7,801,842 B2 | 9/2010 | Dalton |
| 2007/0135992 A1 | 6/2007 | Riise et al. |
| 2007/0216771 A1* | 9/2007 | Kumar ........................... 348/148 |
| 2007/0300296 A1* | 12/2007 | Kudla et al. ...................... 726/13 |
| 2008/0104030 A1* | 5/2008 | Choi et al. ......................... 707/3 |
| 2010/0228602 A1 | 9/2010 | Gilvar et al. |
| 2012/0197852 A1* | 8/2012 | Dutta et al. .................... 707/692 |
| 2012/0197898 A1* | 8/2012 | Pandey et al. ................. 707/741 |
| 2012/0244795 A1* | 9/2012 | Heerdink et al. ............ 455/3.05 |
| 2012/0287854 A1* | 11/2012 | Xie et al. ...................... 370/328 |

OTHER PUBLICATIONS

Braumandl, Reinhard, "Quality of Service and Optimization in Data Integration Systems", Final Doctoral Dissertation/Exam, Dept of Mathematics & Informatics, University of Passau, Feb. 28, 2002, pp. 503-512.

Gummadi, Ravi et al., "SMARTINT: A System for Answering Queries over Web Databases Using Attribute Dependencies", Data Engineering (ICDE) 2010 IEEE Conf., Mar. 2010, pp. 1149-1152.

Jureta, Ivan J. et al., "A Comprehensive Quality Model for Service-Oriented Systems", Software Quality Control Journal, vol. 17, Issue 1, Kluwer Academic Publishers, Mar. 2009, pp. 1-29.

Lacher, Martin S. et al., "A Framework for Personalizable Community Web Portals", Proceedings of Human-Computer Interaction International, 2001, 5 pages.

(Continued)

*Primary Examiner* — Wilson Lee
(74) *Attorney, Agent, or Firm* — Stephen J. Walder, Jr.; Brian P. Verminski (57) ABSTRACT

Mechanisms for selecting data providers to provide input data to an application are provided. A desired region and desired quality of information (QoI) function for the desired region are defined. The desired region is a region for which a condition is to be analyzed by the application. One or more provider regions and one or more QoI functions associated with the one or more provider regions are retrieved. A relevancy level between the one or more provider regions and the desired region is calculated based on the desired QoI function for the desired region and the QoI functions associated with the one or more provider regions. One or more data providers for providing input data to the application are selected based on the calculated relevancy level.

25 Claims, 5 Drawing Sheets

(56) References Cited

OTHER PUBLICATIONS

Bisdikian, Chatschik et al., "A Letter Soup for the Quality of Information in Sensor Networks", IEEE Information Quality and Quality of Service (IQ2S'09) Workshop (in IEEE PerCom'09), Galveston, TX, USA, Mar. 2009, pp. 468-473.

Bisdikian, Chatschik et al., "Building Principles for a Quality of Information Specification for Sensor Information", 12th Intl Conf. on Information Fusion (FUSION'09), Seattle, WA, USA, Jul. 2009, 8 pages.

Burke, J. et al., "Participatory Sensing", World Sensor Web Workshop (in ACM Sensys'06), Boulder, CO, USA, Oct. 31, 2006, 5 pages.

Butkiewicz, Thomas et al., "Multi-Focused Geospatial Analysis Using Probes", Posted online Oct. 27, 2008, 6 pages.

Devillers, Rodolphe et al., "Multidimensional Management of Geospatial Data Quality Information for its Dynamic Use Within GIS", Photogrammetric Engineering & Remote Sensing, vol. 71, No. 2, Feb. 2005, pp. 205-215.

Hershberger, John et al., "Summarizing Spatial Data Streams Using ClusterHulls", 8th Wksp on Algorithm Engineering and Experiments (ALENEX'06), Miami, FL, USA, Jan. 2006, 15 pages.

Huang, W.H. et al., "Topological Map Merging", The Int'l J. of Robotics Research, vol. 24, No. 8, Aug. 2005, pp. 601-613.

Lee, Ryong et al., "Layer-based Media Integration for Mobile Mixed-Reality Applications", Third International Conference on Next Generation Mobile Applications, Services and Technologies, IEEE/INSPEC, 2009, pp. 58-63.

Liu, C.H. et al., "QoI-Aware Wireless Sensor Network Management for Dynamic Multi-Task Operations", IEEE SECON'10, Boston, MA, USA, Jun. 2010, 9 pages.

Maue, Patrick et al., "Data Integration in the Geospatial Semantic Web", Journal of Cases on Information Technology, 11(4), 100-122, Oct.-Dec. 2009, INSPEC, pp. 100-122.

O'Rourke, Joseph et al., "A New Linear Algorithm for Intersecting Convex Polygons", Computer Graphics and Image Processing 19, 1982, pp. 384-391.

Pelekis, Nikos et al., "Literature Review of Spatio-Temporal Database Models", The Knowledge Engineering Review, vol. 19, No. 3, Sep. 2004, pp. 235-274.

Slawski, Bill , "Yahoo Patent Filings on Indexing and Advertising Using Geographic Boundaries", SEO by the Sea, http://www.seobythesea.com/?p=684, Jun. 17, 2007, 8 pages.

Srivatsa, Mudhakar et al., "A Metadata Calculus for Secure Information Sharing", 16th ACM Conference on Computer and Communications Security (CCS'09), Chicago, IL, USA, Nov. 2009, 12 pages.

Xue, Wenwei et al., "Contour Map Matching for Event Detection in Sensor Networks", ACM SIGMOD Int'l Conf. on Management of Data (SIGMOD'06), Chicago, IL, USA, Jun. 2006, pp. 145-156.

\* cited by examiner

```
Algorithm 1 – Aggregate Relevancy
1: Initialize: $\mathcal{F} = \emptyset$, $\mathcal{S} = \emptyset$, $\mathcal{P} = \{1, \ldots, N\}$, $t = 1$ and
   $V^0 = 0$;
2: Set: $\mathcal{F}_i^t = \mathcal{F} \cup \{i\}$, $\mathcal{S}_i^t = \mathcal{S} \cup R_p^i$ for all providers $i \in \mathcal{P}$;
3: Calculate spatial relevancy, $r_s^i(q_d(\omega), q_p^{i,\mathcal{F}}(\omega))$, for all
   regions $\mathcal{S}_i^t$ using equation (4);
4: $k = \arg\max_i \{r_s^i(q_d(\omega), q_p^{i,\mathcal{F}}(\omega))\}$; let $V^t$ the corre-
   sponding maximum value of $r_s^i(\cdot)$;
5: if $V^t = V^{t-1}$ then
6:    STOP;
7: else
8:    Set $\mathcal{F} \leftarrow \mathcal{F}_k^t$, $\mathcal{S} \leftarrow \mathcal{S}_k^t$; $\mathcal{P} \leftarrow \mathcal{P} \setminus \{k\}$;
9:    Go to step 2 with $t \leftarrow t + 1$;
10: end if
```

```
Algorithm 2 – Budget Constrained Aggregate Relevancy
 1: for i = 1 to N do
 2:    for b = 0 to B do
 3:       if c_i ≤ b then
 4:          I = I_{i-1}^{b-c_i}; where: I_0^{b-c_i} ≝ 0 and I_{i-1}^0 ≝ 0;
 5:          I(i) = 1;
 6:          if r_a(q_d, q_p^I) not calculated then
 7:             Calculate r_a(q_d, q_p^I) using (4);
 8:          else
 9:             Get r_a(q_d, q_p^I) from memory;
10:          end if
11:          if r_a(q_d, q_p^I) > Values[i − 1, b] then
12:             Values[i, b] = r_a(q_d, q_p^I);
13:             I_i^b = I;
14:          else
15:             Values[i, b] = Values[i − 1, b];
16:             I_i^b = I_{i-1}^b;
17:          end if
18:       else
19:          Values[i, b] = Values[i − 1, b];
20:          I_i^b = I_{i-1}^b;
21:       end if
22:    end for
23: end for
```

CHARACTERIZING AND SELECTING PROVIDERS OF RELEVANT INFORMATION BASED ON QUALITY OF INFORMATION METRICS

This invention was made with Government support under Contract No.: W911NF-06-3-0001 awarded by U.S. Army. The Government has certain rights in this invention.

BACKGROUND

The present application relates generally to an improved data processing apparatus and method and more specifically to mechanisms for characterizing and selecting providers of relevant information based on quality of information metrics.

In today's society, environmental sensors are increasingly being used to monitor geospatial conditions. For example, traffic cameras and other traffic sensors are used to monitor roadway conditions, weather sensors are used to monitor weather conditions at various geographical locations, cameras are used for facial recognition to identify persons of interest, sensors for monitoring city operations, utility grids, supply chains, surveillance, and the like, and other cameras and sensors are used to monitor a plethora of other geospatial conditions. These cameras and sensors generate a large amount of time-varying geospatial data. The proliferation of such cameras, sensors, and the like, and the resulting large datasets gathered from these spatially-distributed camera and sensor devices provides unprecedented opportunities for increased situation awareness and effective action-taking by end-user smart applications.

These cameras and sensors (hereafter referred to collectively as "sensors") are often associated with a plurality of different providers that each may monitor different geospatial regions. Some of these geospatial regions may overlap with monitored geospatial regions of other sensor providers. The capabilities of these providers, the regulatory/administrative constraints on the provider's domains, market needs and trends, and the like may differ between providers. Thus, it cannot be expected that a single geospatial data provider will be able to fulfill the information needs of the variety of smart applications, i.e. applications configured to perform advance analysis and utilization of data, which can be built to exploit the wide availability of this geospatial information.

SUMMARY

In one illustrative embodiment, a method, in a data processing system, is provided for selecting data providers to provide input data to an application. The method comprises defining, in the data processing system, a desired region and desired quality of information (QoI) function for the desired region. The desired region is a region for which a condition is to be analyzed by the application. The method further comprises retrieving, by the data processing system, one or more provider regions and one or more QoI functions associated with the one or more provider regions. In addition, the method comprises calculating, by the data processing system, a relevancy level between the one or more provider regions and the desired region based on the desired QoI function for the desired region and the QoI functions associated with the one or more provider regions. Moreover, the method comprises selecting, by the data processing system, one or more data providers for providing input data to the application based on the calculated relevancy level.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof will best be understood by reference to the following detailed description of illustrative embodiments when read in conjunction with the accompanying drawings, wherein.

DETAILED DESCRIPTION

The illustrative embodiments provide a mechanism for characterizing and selecting providers of relevant information based on quality of information metrics. As mentioned above, smart applications will most likely need to utilize geospatial data obtained from sensors supplied by a variety of providers. The providers provide various levels of quality of geospatial data which may cover a variety of different domains or geospatial regions. The mechanisms of the illustrative embodiments provide a way of characterizing this geospatial data such that smart applications can select among different providers and/or aggregate information collected from different providers. Moreover, the illustrative embodiments may provide such functionality but instead with regard to spatiotemporal regions and with regard to any type of data provider, not only sensor data providers. For purposes of the following discussion, however, it will be assumed that the illustrative embodiments are directed to the selection of geospatial data providers.

For example, consider the case where a city agency needs to monitor air quality, hazardous materials concentration levels, or the like, throughout the area of its authority. The agency would like to collect air quality information at different quality levels, e.g., higher granularity in densely populated regions and lower granularity at other regions. To collect the needed information, the agency uses sensors that it had deployed in the past. Unfortunately though, due to budget constraints, and other logistical challenges, these sensors cover only a portion of the area of interest. To supplement its information needs, the agency has decided to select and engage third-party fixed and mobile sensory information providers with whom it would create persistent or transient relationships as necessary. The third-party providers could be other city agencies, private operators that, for example, monitor air-quality in public areas (parks, arenas, etc.), fleet operators whose fleet vehicles are equipped (for various reasons) with the necessary sensory devices, and even individuals whose smart-phones are capable of sensing air quality conditions.

The above hypothetical (albeit not improbable) scenario exemplifies a trend where increased deployment and use of sensor networks is ushering a new era where information rich solutions are becoming even more pervasive and integrated parts of our personal and professional lives. However, there are undoubtedly several challenges in realizing the "city agency" scenario. They relate, and not only, to technology, system architecture and design (both hardware and software), operation and management, regulatory constraints, and with this being a city agency, public perception. The present invention is directed to providing a mechanism for dealing with selecting information providers that supply the most relevant information for the needs of the user, e.g., the city agency, other organization, or individual. The mechanisms of the illustrative embodiments establish procedures by which one can compare information sources based on how relevant the information they produce is to the desired and sought after information.

Referring again to the example scenario described above, the city agency may wish to execute a smart application, e.g. an application that performs some relatively complex analysis, on sensor data for a region of interest. In the above example, the smart application may analyze air quality data for a region of interest to determine or predict future air quality conditions or the like, for example. In order to select the sensor data to be used by the city agency, the mechanisms of the illustrative embodiments provide an ability to define a quality of information function and a definition of a region of interest or sensor coverage that is desired by the city agency. In addition, providers of sensor data define their regions of sensor coverage and associated quality of information provided by the sensors. Regions of overlap between that desired by the city agency and that of the providers is calculated. For each overlapping region, the desired and attained quality levels for the information are compared.

The information provider(s) whose comparison results for each overlapping area provide a highest quality of information, a quality of information closest to that desired by the city agency are selected, or the like. Costs associated with the providers may be considered as well when determining a set of one or more information provider(s) such that budgetary constraints may be considered. The result is a set of sensor data from one or a plurality of information providers that may be used by the smart application to achieve a complex analysis based on information having a desired quality over a desired region of interest.

In one illustrative embodiment, the regions of application interest or sensor coverage are approximated through M tuples, where M is a system-wide fixed number. For example, a tuple in this context may represent the triple $\{x, y, f(x,y)\}$ where $f(x,y)$ is the level of desired (by a smart application) or attained (by a sensor network) quality of information for a geospatial point specified by the coordinates (x, y) in a two-dimensional representation of a region of interest or sensor coverage. The invention is not limited to two-dimensional representations and in fact can be used with three-dimensional representations of a region or other types of representations of a region without departing from the spirit and scope of the illustrative embodiments.

The higher the value of M, the more accurate the region representation, but the higher the resource demands. By keeping M fixed system-wide, i.e., for all regions collectively, the maximum storage and/or communication requirements for the system are known. M may be set to any desired integer value according to the specific implementation desired. Thus, based on system and resource capabilities. e.g., with regard to storage and communication resources, an administrator or the like may set M to a desired value.

In one illustrative embodiment, each tuple may be assigned to a sub-region of an original region, i.e. the region of interest in the case of the city agency or the original region of sensor coverage in the case of the sensor data provider. For example, if there are K such sub-regions (e.g. K<=M/3), for each sub-region K, the level of desired/attained quality of information is expressed as a defined function. For example, this may be represented by the average quality value desired/attained throughout the sub-region K, the maximum and minimum quality value, a distribution of the quality values, or the like. In an alternative implementation, given the M tuples, approximate performance through interpolation is utilized, e.g. using two-dimensional splines.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
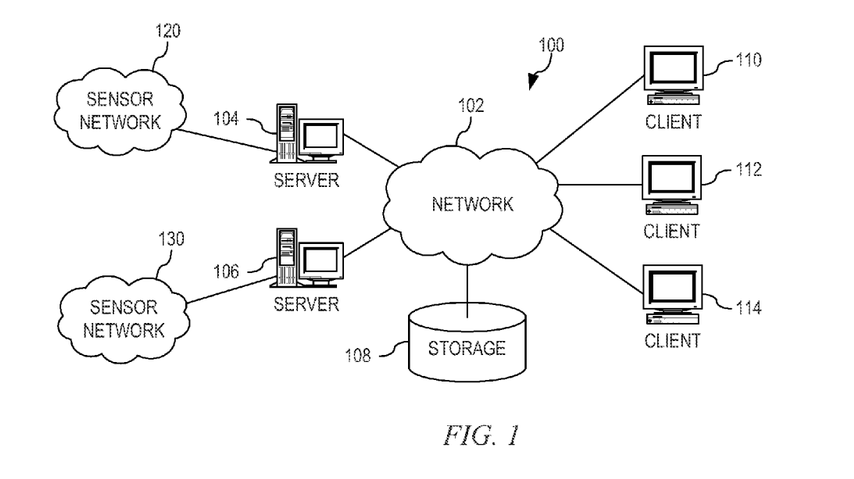
FIG. 1 is an example diagram of a distributed data processing system in accordance with one illustrative embodiment.
Figure 2:
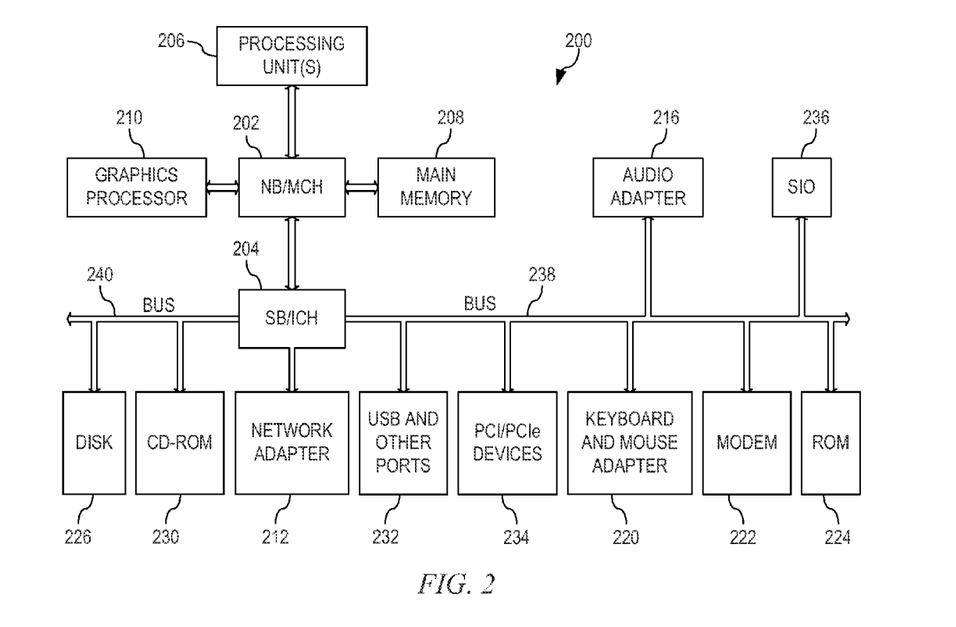
FIG. 2 is an example block diagram of a data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot, files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As illustrated in FIG. 1, the servers 104 and 106 may be coupled to one or more sensor networks 120-130 which may be comprised of a plurality of electronic sensor devices of the same or different types which are able to relay data corresponding to sensed conditioned via one or more data networks to the servers 104 and 106. This data may be made available, through the servers 104 and 106 and network 102, to one or more other servers (not shown), or even client devices 110-114, for use with smart applications in performing relatively complex analysis of the sensor data provided by the sensor networks 120-130. As described in greater detail hereafter, these other servers and/or client devices 110-114 may implement mechanisms in accordance with the illustrative embodiments to select which providers of sensor data to utilize with these smart applications in accordance with desired quality of information and region of interest, and provided quality of information and region of coverage of the various providers of sensor data.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed above, the illustrative embodiments provide a mechanism to capture properties of sensor information against which relevancy can be assessed and metrics may be developed to capture and ensure levels of relevancy. In one illustrative embodiment, geospatial properties of information are used for identifying the relevant information. A geospatial property is a geographical representation of a region, e.g., a point ω(x, y) may represent a specific latitude and longitude of a map.

These geospatial properties also serve as the basis for quality of information (QoI) metadata representing the physical context of information. The QoI metadata represents a desired or provided quality of information where this quality may be specified in a quantitative manner. For example, in the "city agency" scenario above, where the agency wants to monitor hazardous material concentration levels in the air, an example of a desired QoI function can be a function that describes the desired accuracy of the provided information. For example, a desired quality function $q_d(x,y)$ could be the desired accuracy of measurements of air quality at a point ω(x,y), e.g. 99% accuracy. A provided quality function $q_p(x, y)$ can be the actual accuracy (or error) of the measurements provided at point ω(x,y). e.g. 3% or 5% of error.

In some illustrative embodiments, spatiotemporal properties may be used. That is, all of the mechanisms of the illustrative embodiments may operate on either one or both of geospatial and spatiotemporal properties. A spatiotemporal property refers to a representation of not just a region but also a time. For example, the spatiotemporal "point" (x,y,t), represents the location (x,y) and time t. Examples of QoI-related geospatial or spatiotemporal properties of information may include the probability of detecting an event at this point, the error in estimating the concentration of hazmat material in the air at this point, the mean square error (MSF) and possibly the time it takes to estimate and report the trajectory of an object passing that point, the acceptable provenance of the retrieved data, such as the trust in and reputation of the data sources, and so on. The above can be applied to regions of locations (x,y), intervals of time-instants t, or, in general, a region may be defined over spatiotemporal dimensions. However, as noted earlier, the illustrative embodiments will consider geospatial dimensions and selection of providers using geospatially related QoI conditions without departing from the spirit and scope of the present invention.

Assuming compatible types of the sought after and provided information, relevancy is measured by "how geospatially close" a piece of information provided is to the information desired. Specifically, spatial relevancy is defined and measured by the degree of overlap between the region $R_p$ describing the coverage of sensory information from a provider and the region $R_d$ describing the coverage of sensor information desired by a user, smart application, or the like.

As the number and variety of potential sources of information as well as the number of applications that depend on and search for these sources increases, the process of selecting the most relevant sources becomes more and more challenging. Furthermore, the fluidity of untethered sources, e.g. humans in participatory sensing, sensor-equipped vehicles, and other sources that are not tied to a particular organization, adds to the challenge as applications interested in information for a particular geographical region, may need to seek for and bind repeatedly to new(er) relevant sources. These challenges have a three-fold impact: increased processing, storage, and communication requirements. All of these elements are of concern when considering resource-constrained sensor networks and resource-constrained smart application systems. The processing challenge is a direct one as more and more candidate sources have to be assessed and selected from. The other two challenges are more subtle. The increases in the number of sources and applications will inadvertently result in an increase in the pertinent advertisements and exchange of metadata about (at least) the geospatial region information and general quality of information (QoI) properties from the sources and/or desired by the smart applications. This metadata will also have to be stored at various nodes in the network.

There is an additional challenge that can further exacerbate all three previous challenges: metadata expansion. As more sources become available, a new compound source can be created as needed. Using the scenario mentioned above as an example, a new source reporting air-quality from the east and north regions of the city can be created by the combination of regional sources reporting air-quality from the portions of the east, north-east, and north regions of the city. One way to represent the geospatial properties of the compound source is to combine, e.g. take the union of, the corresponding metadata from each of the constituent sources. This will result in more populous entries in this metadata. As more and more sources are compounded this will lead to the unbounded increase of the related metadata entries, which of course will create major management burdens regarding their processing, communication, and storage.

The illustrative embodiments build upon early work by the present inventors described in Bisdikian et al. "A Letter Soup for the Quality of Information in Sensor Networks." IEEE Information Quality and Quality of Service (IQ2S'09), Workshop (in IEEE PerCom'09), Galveston, Tex., USA. March 2009, which is hereby incorporated herein by reference. In this previous work, an introduction of new metrics regarding information relevancy are provided based on the degree of spatial and/or temporal overlapping that there is between desired areas of spatiotemporal interest and provided areas. The present illustrative embodiments build upon these metrics described in this previous work as is described hereafter.

Figure 3:
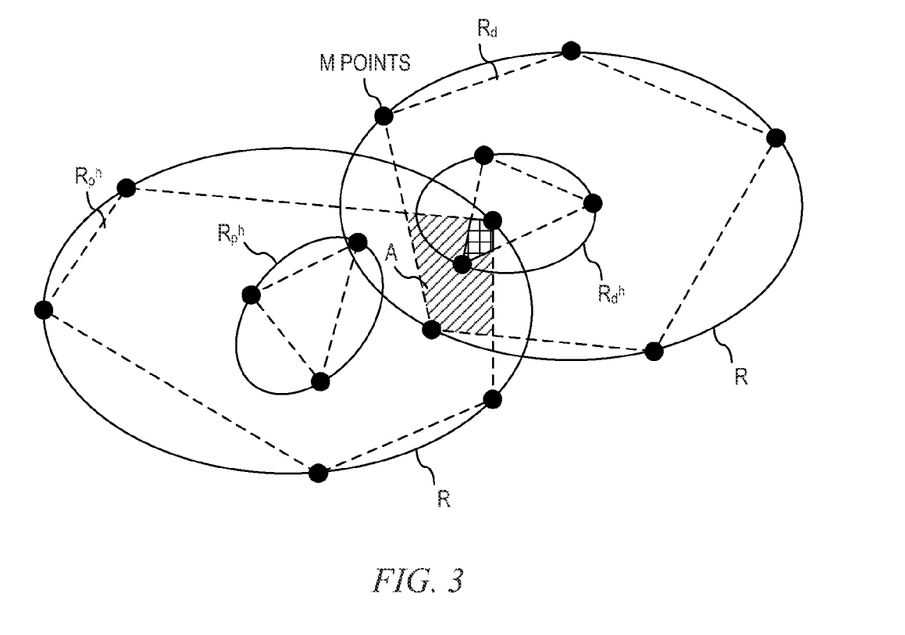
FIG. 3 illustrates the overlap of a region of smart application desirability with a region of provider coverage in accordance with one illustrative embodiment.

FIG. 3 illustrates the overlap of a region of smart application desirability with a region of provider coverage in accordance with one illustrative embodiment. As, shown, and used herein, spatial relevancy is defined as the degree of spatial overlap that exists between the information sought and the information that is provided, e.g., the coverage of the sensor networks supplying the sensor data feeds that a smart application taps into. Consequently, a spatial relevancy metric $r_s$ is defined as follows:

$$r_s(R_d, R_p) = \frac{f(A[R_d, R_p])}{f(A[R_d, R_d])} \quad (1)$$

where $R_d$ is a description of the desired spatial properties of the information sought for a region R, and $R_p$ are spatial properties for the information provided for a region R. A is the area of the overlapping regions $R_d$ and $R_p$ and maps a correlation of the spatial properties of $R_d$ and $R_p$ to non-negative real numbers. The denominator $f(A[R_d, R_d])$ plays the role of a normalization coefficient so that $r_s \in [0, 1]$.

With reference to FIG. 3, $A[R_d, R_p]$ represents the area overlap between region $R_d$ and $R_p$:

$$r_s(R_d, R_p) = \frac{\text{area}[R_d \cap R_p]}{\text{area}[R_d]} \quad (2)$$

By adding gradations in the desirability or quality of information across the regions $R_d$ and $R_p$, one can generalize the "overlap" principle in equation (2) above, and consequently, the information spatial relevancy definition and metric. The superscript h in FIG. 3 stands for higher quality or desirability in contrast to regular quality or desirability. Thus, the areas corresponding to $R_p^h$ and $R_d^h$ are areas where a provider is able to provide higher, quality sensor data and where the smart application desires higher quality sensor data.

Specifically, going beyond the definition of relevancy in the previous work of Bisdikian et al. mentioned above, let $\omega=(x, y)$ be a point in a two dimensional region R and let $q_d$ be a desired QoI function describing the quality of the desired information related to point $\omega$:

$$q_d: \omega \in R_d \rightarrow [0,1], \text{ with } \int_{R_d} q_d(\omega) d\omega < \infty \quad (3)$$

For example, at point $\omega_0$, a detection application "desires" to receive information about event occurrences that have probability of correct detection $z_0$ (i.e. $q_d(\omega_0)=z_0$), or the concentration of air-pollutants at that point with accuracy $\epsilon_0$. The range of $q_d$ could be the entire real line, but it is assumed that it is expressed in relative terms and normalizable with values closer to 1 representing higher desired information quality levels. By convention, $q_d(\omega)$ is set to 0 for all points $\omega$ outside the desired region $R_d$. The provided (or provider) QoI function $q_p(\omega)$ on a set $R_p$ is set in an analogous fashion to $q_d(.)$ and $R_d$. Alternative versions of the above definitions, such as generalizing to higher dimensions, e.g., location points (x,y,z) or spatiotemporal points (x,y,t) or (x,y,z,t), may also be used with the illustrative embodiments without departing from the spirit or scope of the present invention.

According to one operational mode, smart applications may "announce" their information needs by broadcasting their desired QoI function $q_d$ and its support region $R_d$. Interested providers may then respond to the application in kind. According to another operational mode, providers may "advertise" their sensing capabilities by broadcasting their function $q_p$ and its support region $R_p$. Smart applications, users, or the like, can silt through these advertisements and select appropriate providers.

In either case, the smart application ends up with a collection of QoI functions $q_p$ from providers. Based on these QoI functions, and its own QoI function $q_d$, the application assesses the relevancy of the provider's information to its own information needs, ranks them accordingly, and chooses an appropriate set of information from the one or more providers.

To this end, the relevancy metrics are extended as follows:

$$r_s^v(q_d, q_p) = \frac{\int_{R_d \cap R_p} v(q_p(\omega): q_d) d\omega}{\int_{R_d} v_d(q_p(\omega)) d\omega} \quad (4)$$

where $\upsilon(.;q_d)$ represents the value the sensor-enabled application gains in executing its task when it uses information of quality $q_p(\omega)$ at point $\omega$, and $v_d(.)=\upsilon(.;q_d)$. The notation $\upsilon(.;q_d)$ implies that, in general, the value function can be expressed relative to $q_d$. The denominator in equation (4), which is assumed to be finite, plays the role of a normalization factor so that $r_s^v(q_d, q_p) \in [0, 1]$. In one exemplary embodiment, it is assumed that an application gains nothing extra if it receives information of higher quality than what it asked for and thus, for each $\omega \in R_d \cap R_p: \upsilon(q_p(\omega); q_d) \in [0, v_d(q_d(\omega))]$. If the latter is not the case, one may need to appropriately redefine the normalization role of the denominator.

In one illustrative embodiment, the "min" function is used as the value function where "min" satisfies all behaviors expected from a value function. In this case, one obtains (dropping the subscript $\upsilon$ for brevity):

$$r_s(q_d, q_p) = \frac{\int_{R_d \cap R_p} \min(q_p(\omega) \cdot q_d(\omega)) d\omega}{\int_{R_d} q_p(\omega) d\omega} \quad (5)$$

Note that there may be alternative interpretations of equation (4) above, such as probability expectations of some form, or the conditional or relative entropy of the desired information in the presence of the provided information. There may be some operational complications that these interpretations may introduce, such as the need for a priori knowledge or on-demand computation of joint or conditional probability densities between entities (the providers and the applications) that had no prior kinship to each other. Nonetheless, in principle, these alternative interpretations do not alter the fundamentals of advertising desired or provided QoI functions and making provider selections based on them.

Ideally, communicating and manipulating general functions such as $q_d$ and $q_p$ defined over general sets $R_p$ and $R_d$ in order to calculate the relevancy metric in equation (4) requires unpredictable accuracy, storage, and computational resources. Operationally, these functions will be communicated via a collection of QoI metadata approximately describing $R_i$ and the corresponding $q_i$, $i \in \{d, p\}$. Geospatial descriptions of regions, based on various types of polygon representations, provide for the boundaries of regions. These descriptions are typically used to decide topological relationships such as when querying whether a point p of a region A is internal, external, at the boundary, or intersecting another region B.

Since the illustrative embodiments are dealing with region intersections, such as $R_d \cap R_p$, topological relationships play a role. However, the queries in the illustrative embodiments are not topological in nature only. To the contrary, the illustrative embodiments order and select providers based on relevancy assessed over the intersection of support sets for the QoI functions $q_d$ and $q_p$ and of course their values (see equation (4) above) all described by QoI metadata. Note that these QoI metadata will be communicated and stored at recipient nodes, e.g. the application node, or a provider registry, and the QoI functions $q_p$ (and their support sets) could be the result of aggregation from constituent $q_p$'s. Thus, for example, if the QoI metadata entry in a provider registry table may accommodate only up to M elements, then this number is bound to be exceeded if metadata for compound provider are simply the union of the metadata of the constituent providers. Hence, owed to the latter fact, a predictable structure for these metadata will also be required.

Hence, the information relevancy problem at hand is summarized as follows. First, summarize the QoI functions of providers and applications through finite-sized, expansion-proof descriptors (metadata). Using these descriptions, assess the relevancy of providers to an applications' needs. Using these assessments, select one or more of the providers to satisfy the smart applications' needs given selection criteria, such as the most relevant provider, or the most relevant collection of providers given a specified budget constraint (e.g. energy, cost in engaging a provider, bandwidth consumed, etc.).

As stated above, due to the generality of QoI functions $q_d$ and $q_p$, their communication storage, and processing requirements may be quite unpredictable which has severe implications in managing system resources effectively. Hence it would be desirable to describe them in a way that ensures predictable utilization of system resources while acknowledging their role in the process of selecting the most relevant information providers to serve an application's needs based on the relevancy metric $r_s^v$ in equation (4).

To this end, the illustrative embodiments present a mechanism to describe QoI functions using a collection of data points of finite size M. The size M is a design parameter trading-off between efficiency with accuracy in describing quality functions. For example, referring again to FIG. 3, sub-regions or a region R are described using no more than M points. These sub-regions may be defined according to any known or later developed algorithm. For example, points around the region may be utilized, approximating distributions by a finite number of moments, or the like, can be utilized to represent sub-regions using M points.

For each sub-region of each region R, a quality of information (QoI) function is assigned. The QoI function may take many different forms, any of which are within the spirit and scope of the illustrative embodiments. For example, the QoI function may be a constant function (e.g., average quality), a histogram, a Gaussian function (e.g., mean, standard deviation, etc.), or the like.

Having defined the sub-regions of a region and their associated QoI function, spatial relevancy of provider sensor data to desired sensor data is determined. That is, the overlap sub-region A is calculated. A value is assigned to each sub-region, e.g., the integral of $f(x, y)=\min(d(x,y), p(x,y))$ where $d(.)$ and $p(.)$ are the quality values desired and provided for the sub-region, respectively, at point $(x, y)$. The aggregate value is then calculated for each sub-region of overlap between desired and provided regions. This may be done on a per provider basis such that these values may then be used to select a provider that attains a given value within the desired region $R_d$, e.g., a maximum aggregate value.

In another illustrative embodiment, splines are utilized to represent the provider regions desired regions, and the intersection between these regions. Splines are piecewise polynomial curves which are differential up to a prescribed order. A B-spline has the property that every spline of a given polynomial degree can be expressed as linear combination of a set of B-splines of the same degree. The B-spline surfaces are the result of the tensor product of B-spline curves, where a tensor product surface is generated by:

$$p(x,y)=\tau_{i-1}^K \Sigma_{j=1}^L B_i(x) B_j(y) \alpha_{ij} \qquad (6)$$

With $B_i(.)$ and $B_j(.)$ being independent spline curves that form a basis and $\alpha_{ij}$ being the spline control points.

The construction of the B-spline curves $B_i(.)$ and $B_j(.)$ is a two-pass process (one for each variable) and is based on the calculation of the so-called knot vectors and control points $\alpha_{ij}$. The design parameters of the method are the size of the knot vectors, $\eta^x_{knot}$ and $\eta^y_{knot}$, and the spline order along each direction, $\text{order}_x$ and $\text{order}_y$. The spline order is in essence the order of the polynomial used for the approximation. The input of the approximation procedure is the sample matrix of the QoI function q, along with the sampling vectors x and y. The resulting finite description of q consists of P parameters, the knot vectors of size $\eta^x_{knot}$ and $\eta^y_{knot}$, and a matrix of size $(\eta^x_{knot}-\text{order}_x) \times (\eta^y_{knot}-\text{order}_y)$ containing the control points $\alpha_{ij}$. Thus, the finite description of q is $P=\eta^x_{knot}+\eta^y_{knot}+(\eta^x_{knot}-\text{order}_x)*(\eta^y_{knot}-\text{order}_y)$ points. These P parameters are communicated so that the other parties can generate approximated sample points.

Due to their smooth, differentiable behavior, and ease of construction, splines and spline surfaces are popular in approximating single- and multi-variate functions. Because they can be described by a finite number of points, they are also an excellent approximation choice in describing QoI functions $q_p$ and $q_d$. With the mechanisms of one illustrative embodiment, spline surfaces such as in equation (6) above are used along with the aforementioned P control points and knots. Increasing the number of knots of the approximation or the order of the spline, and thus, the number of control points, and eventually P, may give better approximation results and such modifications are considered to be within the spirit and scope of the illustrative embodiments. However, simulation results show efficiency of the mechanisms even with low order approximations.

For example, with regard to the "city agency" scenario presented above, it is assumed that the P parameters to determine the spline approximations are known to all providers that do business with the city. The providers encode their QoI functions, i.e. the $q_p$ functions, using spline surfaces defined by the P parameters. They also calculate the minimum rectangle containing the desired region $R_p$, i.e. a smallest rectangle surrounding the region $R_p$ of available sensor data. This requires three additional $(x, y)$ points, referred to as P(+6) parameters, and is used to speed-up the search process. The "city agency" may encode its QoI function, i.e. its $q_d$ function, likewise.

The city agency distributes a call for providers (CfP) along with its P(+6) parameters of its own $q_d$ function and collects responses from providers. The agency filters out any provider p whose minimum rectangle containing the corresponding $R_p$ does not intersect with the minimum rectangle for $R_q$. The city agency uses the P(+6) parameters to approximate the $q_p$ of any remaining provider by generating $B_i(.)$ and $B_j(.)$, based on the knot vectors for variables x and y, respectively and equation (6). The city agency then determines each provider's relevancy using the approximated $q_p$ and $q_d$ QoI functions in equation (4) and the providers are then ordered accordingly.

Figure 4:
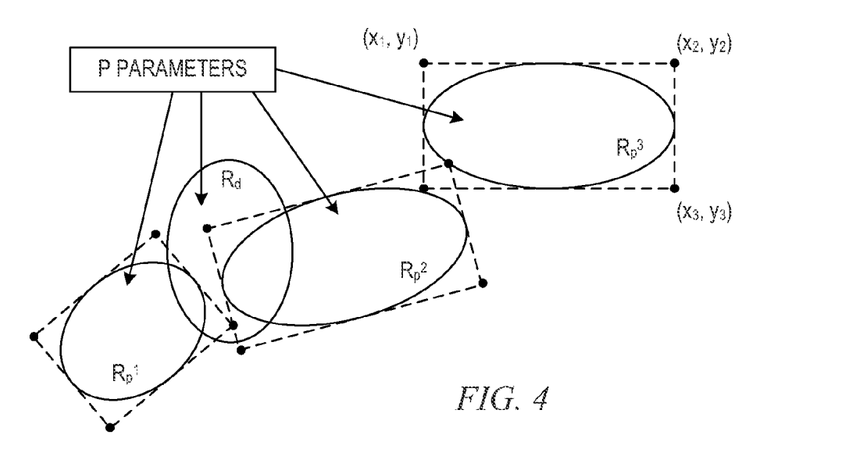
FIG. 4 is an example diagram illustrating multiple desired/provided regions R with the minimum rectangles surrounding provider regions $R_p$.

FIG. 4 is an example diagram illustrating multiple desired/provided regions R with the minimum rectangles surrounding provider regions $R_p$. With regard to the example shown in FIG. 4, B-splines are used to generate P parameters describing $q_i$ in region $R_i$, $i \in \{d, p\}$. Three additional points $\{(x_i, y_i); i=1, 2, 3\}$ are also used to describe the minimum rectangle containing these regions. Note that the CfP may contain just the P parameters, just the 6 rectangle parameters, or all P+6 parameters. Note also that a provider may pre-calculate its $q_p$ approximation or post-calculate it based on the CfP, e.g. use its P points to describe $q_p$, only in the region of interest and not on the entire $R_p$. Moreover, the agency and the providers may communicate with each other directly or through a proxy/broker in the middle.

While it is possible that a single provider may suffice in satisfying an application's needs, it is quite likely that more than one provider will be necessary to satisfy the information needs of many smart applications. In such a case, it would be desirable to be able to judiciously select a number of such providers that cumulatively provide the most relevant information for the information needs of the smart application.

Using one or more of the mechanisms for defining regions and QoI functions described above, the mechanisms of the illustrative embodiments select the most appropriate set of providers from a composition of sensory information providers, based on criteria such as maximum coverage, maximum aggregate geospatial relevancy for a given constraint, or the like. In the context of the city agency scenario described above, this may correspond to the case that the city agency will have to select the most appropriate providers given a budget constraint.

In general it is assumed that a smart application defines its desired QoI function $q_d$ and corresponding region $R_d$, such as using one of the mechanisms described above, for example.

There is also a set P of providers of size |P|=N with $q_p^i$ and $R_p^i$, i∈{1, ..., N} being the corresponding provider QoI functions and regions. With these assumptions, the following cases are considered with this assumption (1) the no-cost case where the minimum number of providers that satisfy the application needs without any budgetary constraints is determined; and (2) the cost case where engaging providers comes at a cost and applications have budgetary constraints.

Taking the no-cost case first, a minimum number of providers that can cover as much of the desired region as possible while attaining as high a quality of information as possible is determined. To this end, let I=[I(1) ..., I(N)] be the provider selection indicator vector, with I(i)=1 if provider I is selected, and I(i)=0 if the provider is not selected. Additionally, let the aggregate provider region $R_p^I$ be the union of all the selected provide regions, i.e.:

$$R_p^I = \cup_{i=1}^N I(i) R_p^i \quad (7)$$

The selection of the appropriate set of providers to maximize the coverage of the desired region with no cost can be modeled by the following optimization problem:

For $1(i) \in \{0,1\}$, $i \in \{1, ..., N\}$, (8)

$$\text{minimize} \sum_{i=1}^N I(i),$$

such that, $$\forall \omega \in R_d \cap \{R_p^1 \cup ... \cup R_p^N\}:$$

(1) $\sum_{i:\omega \in R_d \cap R_p^i} I(i) \geq 1$; and (2) $\max_{i:\omega \in R_D \cap R_p^i} [I(i) \cdot q_p^i(\omega)] = \max_{i:\omega \in R_d \cap R_p^i} [q_p^i(\omega)]$ Constraint (1) is a coverage constraint that states that for each point $\omega \in R_d$ covered by one or more providers, at least one of them will be selected. Constraint (2) is a preference constraint that states that the provider with the highest QoI at a point $\omega$ shall be chosen. Note that this model allows the selection of providers that overlap at some points, however, it assures that the best provider at each point is among the selected ones. Therefore, the formulation is implicitly maximizing the aggregated spatial relevancy.

The definition of the problem above is a generalization of the set covering problem on three dimensions (each 2D point $\omega$ is also associated with a quality value $q_d(\omega)$) and for unity costs. The set covering problem relates to finding the minimum number of sets whose union includes all points of the "universe." It is modeled by the following integer programming formulation: For $I(s) \in \{0,1\}$, for all $s \in S$, $$\text{minimize } \Sigma_{s \in S} c(s) \cdot I(s), \text{ such that } \Sigma_{s:e \in s} I(s) \geq 1 \quad (9)$$

For all elements $e \in \Pi$ where $\Pi$ is the universe of points, S is a family of subsets of $\Pi$, and c(s) is the cost associated with set s in S. The set covering problem is NP-complete and, hence, there is no polynomial time algorithm that solves it. The most efficient algorithm solving (approximately) the set covering problem is a greedy algorithm that is based on the following simple operation: at every iteration, choose the set that contains the largest number of uncovered elements. The algorithm terminates when all elements are contained in the sets already selected.

Figure 5:
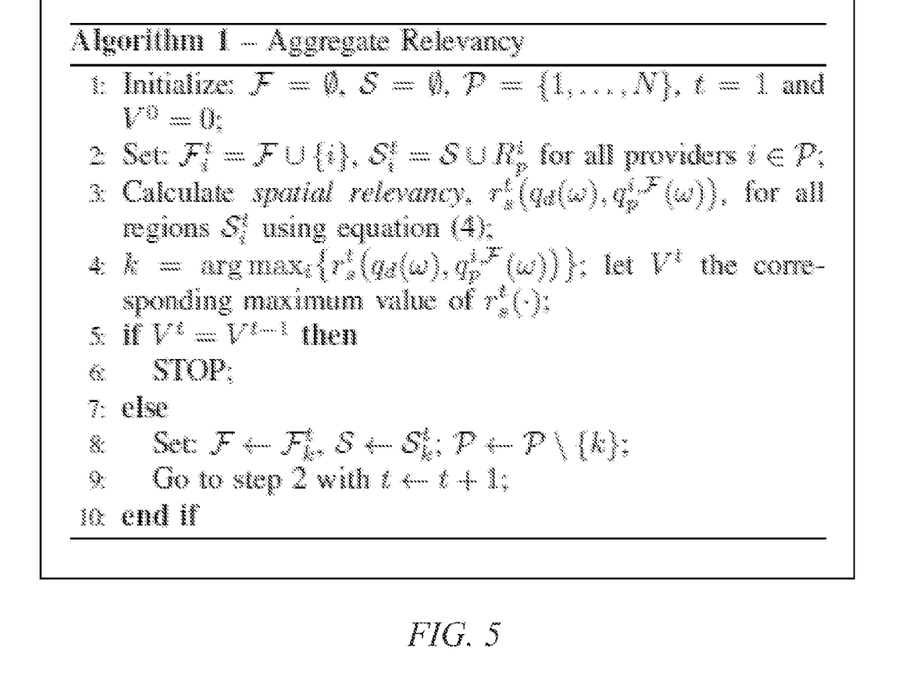
FIG. 5 is an example diagram of one such algorithm that may be implemented using the mechanisms of the illustrative embodiments.

In view of the above, the mechanisms of the illustrative embodiments make use of an algorithm, implemented in either software, hardware, or a combination of software and hardware which at each iteration selects the most appropriate subset of providers that maximize the total relevancy with respect to the desired information, which is described by the QoI function $q_d$. FIG. 5 is an example diagram of one such algorithm that may be implemented using the mechanisms of the illustrative embodiments. However, it should be appreciated that FIG. 5 is only an example and is not intended to state or imply any limitation with regard to the types of algorithms that may be used or implemented by the illustrative embodiments.

With reference to FIG. 5, because of the possibility that $R_d \cap R_p^I$ contains infinitely many points, the selection criteria at each iteration is not the number of points contained in each set of providers but, instead, the increase in the spatial relevancy metric. Thus, the provider that results in the largest increase in the aggregate relevancy is chosen at each iteration and the algorithm terminates when none of the remaining providers can increase the aggregate relevancy further.

More specifically, at each iteration t, the aggregate region S of the already selected providers $\mathcal{F}$, i.e. $S = \cup_{k \in F} R_p^k$, is merged with the new candidate region $R_p^I$. Then, the relevancy of the aggregated QoI function $q_p^{i,\mathcal{F}}(\omega)$ is calculated for all candidate providers i and the ones in the already selected set $\mathcal{F}$. Consequently, the provider leading to the highest aggregate relevancy $(V^t)$ is selected until there is no further increase in the total relevancy.

In step 3 of the algorithm shown in FIG. 5, the aggregated QoI function $q_p^{i,\mathcal{F}}(\omega)$ is used, which represents the collective behavior of the already selected providers (in the set $\mathcal{F}$) and the new candidate provider i at the point $\omega \in S$. Specifically, given two providers i and j with $q_p^k$ and $R_p^k$, $k \in \{i,j\}$, their respective QoI functions and provider regions, their combined QoI function $q_p^{i,j}$ is defined on $R_p^i \cup R_p^j$ where $q_p^{i,j}(\omega) = h(q_p^i(\omega), q_p^j(\omega))$. Recall that $q_p$ is set to 0 outside its region $R_p$. The transformation h(.) produces another QoI function from the constituent QoI functions which reflects how the quality of fused information is assessed. For example, if the accuracy (or error) of a measurement from provider i at point $\omega$ is 3% and from provider j is 5%, the aggregated quality form the two providers could be the best of the two, i.e. 5%. i.e. h=max." The latter example h(.) may be utilized such that for $\omega \in R_p^i \cup R_p^j$:

$$q_p^{i,j}(\omega) \underline{d\alpha l} h(q_p^i(\omega), q_p^j(\omega)) = \max\{q_p^i(\omega), q_p^j(\omega)\} \quad (10)$$

The algorithm in FIG. 5 can be implemented in polynomial time, i.e. the computation time of the algorithm is no greater than a polynomial function of the algorithm size. At each iteration, the algorithm determines the optimal provider to select, but this may not necessarily lead to the optimal overall solution, which is similar to how the greedy algorithm behaves for the set covering problem discussed above.

The above scenario, and algorithm shown in FIG. 5, assumes that there are no costs for using third party sensory information. That is, the algorithm in FIG. 5 identifies the best subset of providers that maximize the aggregate spatial relevancy of information independent of cost. The following scenario and algorithm are directed to the situation in which cost is taken into account when choosing an optimal set of providers for providing required information for a smart application.

Taking again the city agency example mentioned above, since nothing is free, the city agency will have to face the realities of budgetary constraints sooner or later. In such a case, suppose that the city agency's budget is B and the provider i's cost is $c_i$, i=1, ... N. The cost $c_i$ could be a flat rate that the provider charges or a contracted price reflective of the attained relevancy $r_s(q_d, q_p^i)$. Thus, under these conditions, it is now the case that the optimal set of providers that will maximize the spatial relevancy of the provided information needs to be found subject to the budget constraint B. Again, this case can be modeled by a combinatorial optimization problem.

Specifically, let again l(i) be the 0-1 indicator variables for selecting provider i, and let 1 be the corresponding vector. Thus, the formulation of the optimization problem in this case will be:

For $I(i) \in \{0,1\}$, $i \in \{1, \ldots, N\}$, $$\text{maximize } r_s(q_d, q_p^I), \text{ such that } \Sigma_{i=1}^{N} l(i) \cdot c_i \leq B \quad (11)$$

where $r_s(q_d, q_p^I)$ is the relevancy of a "super-provider" with a QoI function aggregated from the providers indicated by selection vector I, as discussed earlier in relation to equation (10) and defined on $R_p^I$ in equation (7). It is noted that in this scenario, the increase of the relevancy when adding a specific provider i does not only depend on i alone but on the already selected providers as well. In the case that the providers already selected are offering good enough quality on all points $\omega$ in $R_p^i$, adding provider i may not increase the relevancy attained.

The problem associated with this scenario is a generalization of the 0-1 knapsack problem where the value of each item is a function of the items already selected to be included in the knapsack. For example, adding a lighter in the knapsack may reduce (even to zero) the subsequent value of a box of matches. This is captured with the use of $q_p^I$ as a function of the vector I. The 0-1 knapsack problem is an NP-hard optimization problem which means that there is no algorithm that finds the optimal solution in polynomial time. The greedy algorithm would need to check all $2^N$ different combinations between the N providers, prune those that do not satisfy the available budget, and then choose the combination that maximizes the aggregate relevancy.

Figure 6:
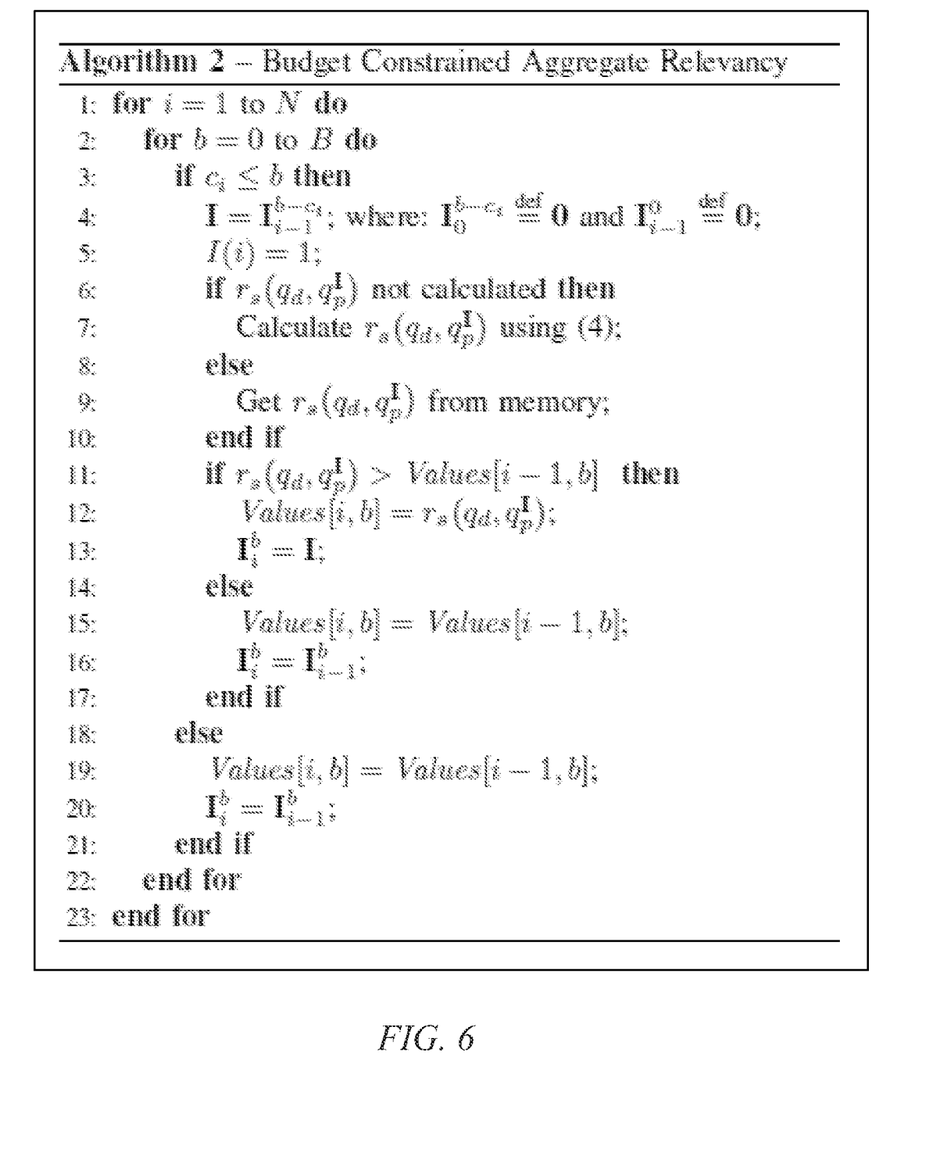
FIG. 6 is an example diagram of a dynamic algorithm that can be used to solve the combinatorial problem of the illustrative embodiments in pseudo-polynomial time in accordance with one illustrative embodiment.

FIG. 6 is an example diagram of a dynamic programming algorithm that can be used to solve the combinatorial problem of the illustrative embodiments in pseudo-polynomial time in accordance with one illustrative embodiment. The algorithm splits the main problem into smaller sub-problems and stores some of the intermediate results for later use to speed up the calculation of the main problem.

As a dynamic programming algorithm, the algorithm of FIG. 6 trades memory space for time. In other words, the algorithm in FIG. 6 splits the problem into smaller sub-problems, stores their solutions into memory, and then uses them to calculate the solution of the main problem. The algorithm in FIG. 6 iteratively constructs the N×B matrix Values, whose entries Values[i,b] are the maximum aggregate spatial relevancy of the first i providers for a budget of b: the corresponding provider selections reside in the indicator vector $I_i^b$. Entry Values [N, B] stores the maximum aggregate spatial relevancy of all providers for budget B, which is the optimal solution for the budgetary constraint scenario and the optimal provider selection will reside in the vector $I_N^B$.

As mentioned earlier, the problem of the budgetary constraint scenario is an extension of the 0-1 knapsack problem with variable item value. Therefore, steps 6-9 of the algorithm in FIG. 6 calculate the spatial relevancy (i.e. the "value") of the specific selection vector I. The spatial relevancy of vectors I that have already been calculated at earlier iterations are evoked from memory. This has a significant impact in accelerating the algorithm execution. Moreover, steps 11-21 of the algorithm in FIG. 6 determine whether selecting a new provider will result in higher aggregate spatial relevancy, in which case the provider is selected; otherwise the provider is not selected.

The dynamic programming algorithm for the 0-1 knapsack problem has complexity of O(nB), where n is the number of items and B is the available budget. In the worst case, the algorithm in FIG. 6 will calculate the spatial relevancy $r_s(q_d, q_p^I)$ at each iteration, which needs O(N) time. Therefore, the absolutely worst case time complexity of the algorithm of FIG. 6 is $O(N^2 B)$, where N is the total number of providers. Regarding the memory requirements, in the worst case, it is necessary to store the matrix Values of size N×B, the relevancy values $r_s(q_d, q_p^I)$ for each selection vector I, which are in total min$\{2^N$, N×B$\}$, and the optimal selection vector $I_i^b$ of size N for the N×B iterations of the algorithm. However, the implementation of the algorithm can be improved both in time and memory requirements significantly in two ways.

First, instead of examining all N providers, the algorithm can be run only for those regions that are intersecting. More specifically, as mentioned earlier, by convention, the QoI functions $q_d$ or $q_p$ (of each provider) are defined to be 0 for all points $\omega$ outside the respective regions $R_d$ or $R_p$. This implies that when two geospatial regions intersect, the respective QoI functions intersect, and vice versa.

The intersection operation is run only once, at the beginning of the process, and can be implemented in linear time. Then, instead of iterating for all values in the range [0, B], the algorithm can calculate the greatest common divisor gcd of $c_i$, i=1, ..., N and B and then run the algorithm in the range [0. B/gcd] with costs $c_i$/gcd, i=1 ..., N.

It should further be noted that various criteria tot selection of providers of sensor data may be used with the mechanisms of the illustrative embodiments. These criteria may be described through the "budget" constraints mentioned above, where a combination of conditions that need to be accommodated are given within budget definition. For example, when engaging with a provider P, there may be a cost for using the provider P's services (paid to the provider) and a cost for connecting to provider P (paid to a network services provider). This represents the cost engaging with the provider and all these costs must be considered with regard to the budgetary constraints.

More specifically, as mentioned above, the definition of the criteria may take many forms, such as the criteria being the most relevant provider, or the most relevant set of providers given a specified budget constraint, or the like. FIGS. 5 and 6 propose algorithms to find solutions based on these two example criteria but other criteria may be used in addition to or in replacement of, these criteria. The algorithm in FIG. 5 identifies the most appropriate set of providers (one or more) so that the aggregate spatial relevancy is maximized. Thus, in this case, the criterion used is the maximum aggregate spatial relevancy. The algorithm in FIG. 6, identifies the best set of providers (one or more) that maximize the aggregate spatial relevancy while also taking into account an additional budget constraint. This budget could represent money, energy, time or another quantity or combination of quantities. Thus, in this case the criteria are: 1) the maximum aggregate spatial relevancy, and 2) the budget constraint. In FIG. 6, B is a generic variable that, represents the total budget (either it is money, time, total energy, some other quantity, or a combination of these and/or other quantities) and variable $c_i$ is the cost of using provider i (either in terms of money, time, energy, some other quantity, or a combination of these and/or other quantities). Any type of quantifiable criteria may be specified as a budgetary constraint without departing from the spirit and scope of the illustrative embodiments.

Thus, the illustrative embodiments provide mechanisms for selecting which providers of sensor data in sensor networks are to be selected for having their sensor data used with a smart application. The selection is based on the degree of overlapping regions between a regions a provider can provide sensor data for, and a region of interest to the smart application. In addition, quality of information (QoI) functions are defined for the providers and/or the regions of sensor data provided by the providers and used as a selection mechanism when comparing against desired QoI functions defined for the smart application. Moreover, budgetary constraints may be taken into account when determining a set of providers whose sensor data is to be used to achieve the purposes of a smart application.

Figure 7:
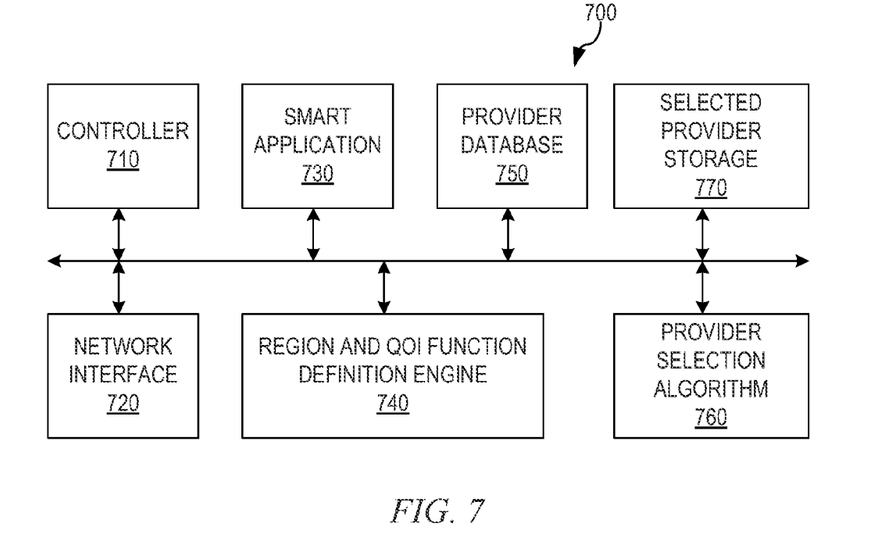
FIG. 7 is an example block diagram of a mechanism for selecting sensor data providers for providing sensor data input to a smart application in accordance with one illustrative embodiment.

FIG. 7 is an example block diagram of a mechanism for selecting sensor data providers for providing sensor data input to a smart application in accordance with one illustrative embodiment. The elements shown in FIG. 7 may be implemented in hardware, software, or any combination of software and hardware. In one illustrative embodiment, the elements shown in FIG. 7 are implemented as software executing on one or more processors of one or more data processing devices. These one or more data processing devices may be client computing devices or server computing devices such as those shown in FIGS. 1 and 2, or other types of computing devices generally known in the art.

As shown in FIG. 7, the sensor data provider selection mechanism 700 comprises a controller 710, a network interface 720, a smart application 730, a desired region and QoI definition engine 740, a provider database 750, a selection algorithm 760, and a selected provider storage 770. The controller 710 controls the overall operation of the mechanism 700 and orchestrates the operation of the other elements 720-770. The network interface 720 provides a communication pathway through which user and provider information can be received, requests can be sent out to users and providers, and results data and other data may be communicated with other devices via one or more networks.

The smart application 730 is shown as being resident on the mechanism 700, however the illustrative embodiments do not require such. To the contrary, the mechanism 700 may be used simply as a selection mechanism and may provide selected provider sensor data to another computing device, or set of computing devices, on which the smart application 730 is executing. Regardless of the particular implementation, the smart application 730 is the consumer of the sensor data provided by one or more sensor data providers selected using the selection mechanism 700. In the case where the smart application 730 is present on the same computing device as the selection mechanism 700, a user and/or provider of sensor data may provide input to the smart application 730 via the network interface 720 and may receive requests/results from the smart application 730 via the network interface 720.

The desired region and QoI engine 740 provides a mechanism through which a user, the smart application 730, system administrator, or other entity can define the desired geospatial region of interest to the smart application 730 and the desired quality of information (QoI) sought for the geospatial region of interest. The geospatial region of interest, as described above, can be defined in a two dimensional manner, three dimensional manner, or the like, using tuples or the like. For example, the geospatial region of interest may be defined in terms of x, y coordinates, latitude/longitude coordinates, or any other coordinate system that is suitable for defining a geospatial region. The QoI function may be defined in any suitable manner to define the quality of the information provided or desired.

The provider database 750 stores provider identifiers and corresponding regions of sensor data provided by the providers as well as their own QoI functions for the various regions of sensor data. This database 750 may be updated dynamically by the providers and situations change, e.g., additional sensors are installed, sensors become faulty, or the like. The database 750 may be reused by the selection mechanism 700 when new or other smart applications 730 request provider selection functionality from the selection mechanism 700, or when new regions of interest are to be the subject of the smart application 730.

The selection algorithm 760 operates on the defined region of interest, the defined desired QoI function, and the information stored in the provider database 750 to select a set of one or more providers that represent a best fit for providing sensor data to the smart application 730. The algorithm 760 itself may take many different forms. Some examples of algorithms that could be used as the selection algorithm 760 are provided in FIGS. 5 and 6 discussed above. The results of the operation of the algorithm 760 is an identification of a set of one or more providers of sensor data that may be used to provide sensor input data to the smart application 730. The identifiers of these providers may be stored in provider storage 770 for use by the smart application 730 when determining where to obtain its sensor data input when the smart application 730 is executed. This information may be retrieved from the providers and input to the smart application 730 which performs its analysis on the sensor data and provides a useful output.

Figure 8:
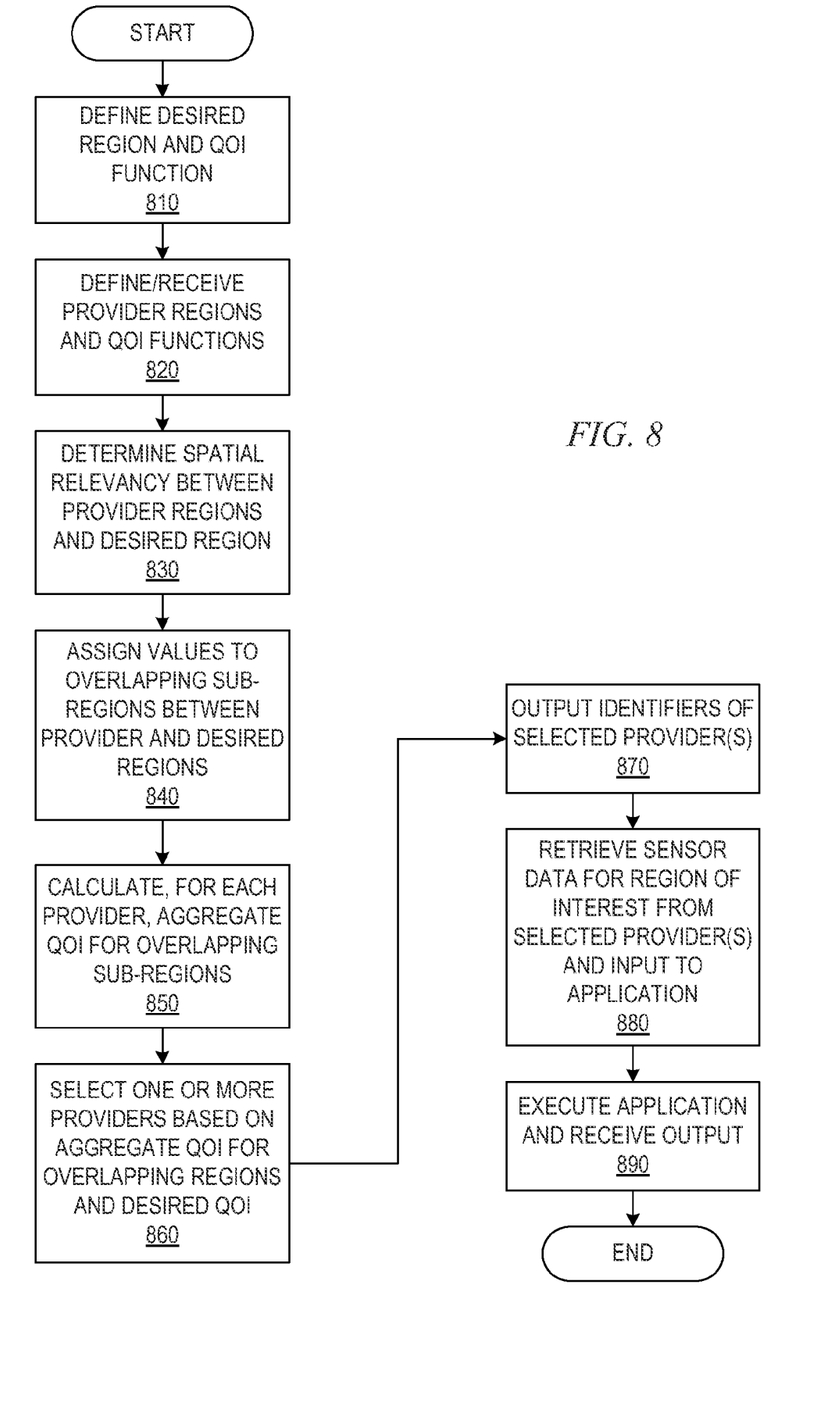
FIG. 8 is a flowchart outlining an overall operation for selecting one or more providers of sensor data for use with a smart application in accordance with one illustrative embodiment.

FIG. 8 is a flowchart outlining an overall operation for selecting one or more providers of sensor data for use with a smart application in accordance with one illustrative embodiment. As shown in FIG. 8, the operation starts with defining a region of interest $R_d$ and a desired quality of information (QoI) function $q_d$ for the region whose sensor data is to be analyzed by the smart application (step 810). Regions $R_p$ of sensor data that providers can provide are defined along with associated QoI functions (step 820). Spatial relevancy between the provider regions $R_p$ and the desired region $R_d$ are determined (step 830) and corresponding values are assigned to overlapping sub-regions between various $R_p$ and $R_d$ for each provider (step 840). An aggregate QoI value for each providers' corresponding overlapping sub-regions is determined (step 850) and one or more providers are selected based on the aggregate QoI values in order to attain the desired QoI over the region of interest $R_d$ (step 860). The identifiers of the set of one or more providers are output (step 870) and the identifiers are used to retrieve sensor data for the region of interest $R_d$ from these providers and input the sensor data into the smart application (step 880). The smart application executes on the retrieved sensor data from the selected one or more providers and provides an output based on the function the smart application performs (step 890). The operation then terminates.

While the above embodiments are directed to the selection of sensor data providers based on overlapping regions and associated QoI functions, the illustrative embodiments are not limited to such. To the contrary, the illustrative embodiments may be implemented with any types of data providers and are not limited to sensor data providers. Thus, the invention can be used to select between any type of data provider based on overlapping spatial and/or temporal regions and defined QoI functions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for selecting data providers to provide input data to an application, comprising:
    defining, in the data processing system, a desired region and desired quality of information (QoI) function for the desired region, wherein the desired region is a region for which a condition is to be analyzed by the application;
    retrieving, by the data processing system, one or more provider regions and one or more QoI functions associated with the one or more provider regions;
    calculating, by the data processing system, a relevancy level between the one or more provider regions and the desired region based on the desired QoI function and the QoI functions associated with the one or more provider regions; and
    selecting, by the data processing system, one or more data providers for providing input data to the application based on the calculated relevancy level.

2. The method of claim 1, wherein calculating the relevancy level between the one or more provider regions and the desired region comprises calculating the relevancy level based on an overlap of the one or more provider regions and the desired region.

3. The method of claim 1, wherein calculating a relevancy level between the one or more provider regions and the desired region comprises:
    identifying one or more sub-regions of the one or more provider regions that overlap one or more sub-regions of the desired region; and
    calculating, by the data processing system, a value for each sub-region that overlaps one or more sub-regions of the desired region based on the QoI function associated with the sub-region.

4. The method of claim 3, wherein calculating a relevancy level between the one or more provider regions and the desired region further comprises:
    aggregating, for each data provider separately, the values for sub-regions that overlap the one or more sub-regions of the desired geospatial region, wherein the one or more data providers are selected based on the aggregated values for each of the data providers.

5. The method of claim 4, wherein selecting the one or more data providers based on the aggregated values for each of the data providers comprises selecting a data provider that has a largest aggregated value.

6. The method of claim 1, wherein the desired region and the one or more provider regions are defined using spline curves.

7. The method of claim 1, wherein the data providers provide input data that represents at least one of geospatial properties or spatiotemporal properties.

8. The method of claim 1, wherein the desired QoI function specifies a desired level of accuracy of data for the desired region, and wherein the QoI functions associated with the one or more provider regions specifies an accuracy of data provided by the data provider for the one or more provider regions.

9. The method of claim 1, wherein the application broadcasts the desired region and associated QoI function to the one or more data providers.

10. The method of claim 1, wherein the one or more data providers broadcast their associated provider regions and associated QoI functions for their associated provider regions to application providers.

11. The method of claim 1, wherein each of the QoI functions associated with the one or more provider regions are defined based on a collection of data points having a maximum finite size M.

12. The method of claim 1, wherein the desired QoI function and the QoI functions associated with the one or more provider regions comprises at least one of a constant function, a histogram, or a Gaussian function.

13. A computer program product comprising a non-transitory computer readable storage medium having a computer readable program stored therein, wherein the computer readable program, when executed on a data processing system, causes the data processing system to:
    define a desired region and desired quality of information (QoI) function for the desired region, wherein the desired region is a region for which a condition is to be analyzed by an application;
    retrieve one or more provider regions and one or more QoI functions associated with the one or more provider regions;
    calculate a relevancy level between the one or more provider regions and the desired region based on the desired QoI function and the QoI functions associated with the one or more provider regions; and
    select one or more data providers for providing input data to the application based on the calculated relevancy level.

14. The computer program product of claim 13, wherein the computer readable program causes the data processing system to calculate the relevancy level between the one or more provider regions and the desired region by calculating the relevancy level based on an overlap of the one or more provider regions and the desired region.

15. The computer program product of claim 13, wherein the computer readable program causes the data processing system to calculate a relevancy level between the one or more provider regions and the desired region by:

identifying one or more sub-regions of the one or more provider regions that overlap one or more sub-regions of the desired region; and calculating, by the data processing system, a value for each sub-region that overlaps one or more sub-regions of the desired region based on the QoI function associated with the sub-region.

16. The computer program product of claim 15, wherein the computer readable program further causes the data processing system to calculate a relevancy level between the one or more provider regions and the desired region by:

aggregating, for each data provider separately, the values for sub-regions that overlap the one or more sub-regions of the desired region, wherein the one or more data providers are selected based on the aggregated values for each of the data providers.

17. The computer program product of claim 16, wherein the computer readable program causes the data processing system to select the one or more data providers based on the aggregated values for each of the data providers by selecting a data provider that has a largest aggregated value.

18. The computer program product of claim 13, wherein the desired region and the one or more provider regions are defined using spline curves.

19. The computer program product of claim 13, wherein the data providers provide input data that represents at least one of geospatial properties or spatiotemporal properties.

20. The computer program product of claim 13, wherein the desired QoI function specifies a desired level of accuracy of data for the desired region, and wherein the QoI functions associated with the one or more provider regions specifies an accuracy of data provided by the data provider for the one or more provider regions.

21. The computer program product of claim 13, wherein the application broadcasts the desired region and associated QoI function to the one or more data providers.

22. The computer program product of claim 13, wherein the one or more data providers broadcast their associated provider regions and associated QoI functions for their associated provider regions to application providers.

23. The computer program product of claim 13, wherein each of the QoI functions associated with the one or more provider regions are defined based on a collection of data points having a maximum finite size M.

24. The computer program product of claim 13, wherein the desired QoI function and the QoI functions associated with the one or more provider regions comprises at least one of a constant function, a histogram, or a Gaussian function.

25. An apparatus, comprising:
a processor; and
a memory coupled to the processor, wherein the memory comprises instructions which, when executed by the processor, cause the processor to:
define a desired region and desired quality of information (QoI) function for the desired region, wherein the desired region is a region for which a condition is to be analyzed by the application;
retrieve one or more provider regions and one or more QoI functions associated with the one or more provider regions;
calculate a relevancy level between the one or more provider regions and the desired region based on the desired QoI function and the QoI functions associated with the one or more provider regions; and
select one or more data providers for providing input data to the application based on the calculated relevancy level.

* * * * *